US012803016B2

(12) United States Patent
Horiuchi

(10) Patent No.: US 12,803,016 B2
(45) Date of Patent: Nov. 17, 2026

(54) FUEL CELL SYSTEM

(71) Applicant: HONDA MOTOR CO., LTD., Tokyo (JP)

(72) Inventor: Yuhei Horiuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 620 days.

(21) Appl. No.: 18/231,939

(22) Filed: Aug. 9, 2023

(65) Prior Publication Data

US 2024/0072275 A1 Feb. 29, 2024

(30) Foreign Application Priority Data

Aug. 26, 2022 (JP) ................................ 2022-134731

(51) Int. Cl.
*H01M 8/04119* (2016.01)

(52) U.S. Cl.
CPC ... *H01M 8/04141* (2013.01); *H01M 8/04164* (2013.01); *H01M 8/04179* (2013.01)

(58) Field of Classification Search
CPC ......... H01M 8/04141; H01M 8/04164; H01M 8/04179; H01M 8/04126; H01M 8/04253; H01M 8/04228; Y02E 60/50
See application file for complete search history.

(56) References Cited

U.S. PATENT DOCUMENTS

2004/0062975 A1* 4/2004 Yamamoto ........ H01M 8/04156 429/408
2009/0068539 A1 3/2009 Kanazawa
2010/0151337 A1* 6/2010 Kanazawa ........ H01M 8/04126 261/105
2010/0255394 A1 10/2010 Wake et al.
2021/0159522 A1 5/2021 Yoshitomi

FOREIGN PATENT DOCUMENTS

JP 2001256989 A * 9/2001
JP 2006-185797 A 7/2006
JP 2008-304114 A 12/2008
JP 2009-123517 A 6/2009
JP 2009-129749 A 6/2009
JP 2010-244778 A 10/2010
JP 5157086 B2 3/2013
JP 2020-161361 A 10/2020
JP 2021-082547 A 5/2021

OTHER PUBLICATIONS

Office Action dated Oct. 1, 2025 issued in the corresponding Japanese Patent Application No. 2022-134731 with the English machine translation thereof.

* cited by examiner

*Primary Examiner* — Daniel S Gatewood
(74) *Attorney, Agent, or Firm* — Carrier, Shende & Associates P.C.; Fulchand P. Shende; Joseph P. Carrier

(57) ABSTRACT

A fuel cell system includes a fuel cell stack and a humidifier. A pipe is provided at an outlet of the humidifier. A gas having flowed through the humidifier flows through a flow passage formed in the pipe. An outlet of the flow passage is provided with an on-off valve. Further, the fuel cell system includes a water trap communicating with the flow passage. The water trap is arranged at a lower position than the flow passage. The on-off valve is disposed at a higher position than the water trap.

9 Claims, 10 Drawing Sheets

110

FUEL CELL SYSTEM

CROSS-REFERENCE TO RELATED APPLICATIONS

This application is based upon and claims the benefit of priority from Japanese Patent Application No. 2022-134731 filed on Aug. 26, 2022 the contents of which are incorporated herein by reference.

BACKGROUND OF THE INVENTION

Field of the Invention

The present invention relates to a fuel cell system including a fuel cell stack and a humidifier.

Description of the Related Art

In recent years, research and development have been conducted on fuel cells that contribute to energy efficiency in order to ensure that more people have access to affordable, reliable, sustainable and modern energy. Further, in order to reduce the burden on the global environment, the vehicle emissions control has been more stringent. In view of the above, attempts have been made to mount a fuel cell system instead of an internal combustion engine in a moving object such as an automobile. This is because $CO_2$, $SO_x$, $NO_x$, and the like are not discharged from the fuel-cell system.

The fuel cell system includes a fuel cell stack in which a plurality of unit cells are stacked. For operating the fuel cell stack, a fuel gas is supplied to anodes of the unit cells, and an oxygen-containing gas is supplied to cathodes of the unit cells. At the cathodes, water is produced by electrode reactions. The produced water is discharged from the cathodes along with the oxygen-containing gas that has not been used in the electrode reactions. Hereinafter, the oxygen-containing gas that has passed through the cathodes without being used in the electrode reactions is referred to as a cathode off-gas.

The cathode off-gas is sent to a humidifier. A porous membrane is provided inside the humidifier. The produced water in the cathode off-gas is separated from the oxygen-containing gas by the porous membrane. The oxygen-containing gas to be newly supplied to the cathodes flows through the humidifier. The produced water separated from the cathode off-gas is given to the oxygen-containing gas. The oxygen-containing gas thus humidified by the produced water is then supplied from the humidifier to the cathodes. As described above, both the oxygen-containing gas supplied to the cathodes and the cathode off-gas having passed through the cathodes have water contents.

A pipe is provided between the humidifier and the fuel cell stack. In JP 5157086 B2, it is proposed to provide a water trap in a cathode-side gas supply piping extending from a humidifier to a fuel cell stack. JP 5157086 B2 describes that dew condensation water is retained in the water trap, so that the dew condensation water can be prevented from remaining in the fuel cell stack and the humidifier.

SUMMARY OF THE INVENTION

Piping around the humidifier includes an on-off valve. The water content in the cathode off-gas or the oxygen-containing gas may adhere to the on-off valve and condense. In a case where the outside temperature is below the freezing point, dew condensation water freezes while the fuel cell stack is not in operation. In general, the on-off valve is closed while the fuel cell stack is not operating. If water freezes in this state, it becomes difficult to open the on-off valve until the fuel cell system has been warmed to a predetermined temperature.

An object of the present invention is to solve the aforementioned problem.

According to an aspect of the present invention, there is provided a fuel cell system including: a fuel cell stack; a humidifier to which an oxygen-containing gas to be supplied to a cathode of the fuel cell stack and a cathode off-gas discharged from the fuel cell stack are introduced; a pipe having a flow passage through which either the oxygen-containing gas having flowed through the humidifier or the cathode off-gas having flowed through the humidifier flows; an on-off valve provided at an outlet of the flow passage and configured to open the flow passage while the fuel cell stack is in operation and close the flow passage while the fuel cell stack is not in operation; and a water trap communicating with the flow passage, wherein with high or low defined using a vertical direction as a reference, the water trap is positioned lower than the flow passage and the on-off valve is positioned higher than the water trap.

While the fuel cell stack is not in operation, water content in the oxygen-containing gas or the cathode off-gas condenses. As a result, dew condensation water is generated. Since the water trap is arranged at the lower position than the flow passage, the dew condensation water flows into the water trap by gravity. Since the on-off valve is disposed at a higher position than the water trap, it is difficult for the dew condensation water retained in the water trap to move to the on-off valve without any help from others.

For the reasons described above, the dew condensation water can be prevented from coming into contact with the on-off valve while the fuel cell stack is not in operation. Therefore, even in an environment where there is a possibility of freezing as in the case where the outside temperature is below the freezing point, there is no concern that the water adhering to the on-off valve will freeze. Therefore, even in the case where the fuel cell system is activated in the outside at a temperature below the freezing point, the on-off valve can be quickly opened and closed.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE INVENTION

Figure 1:
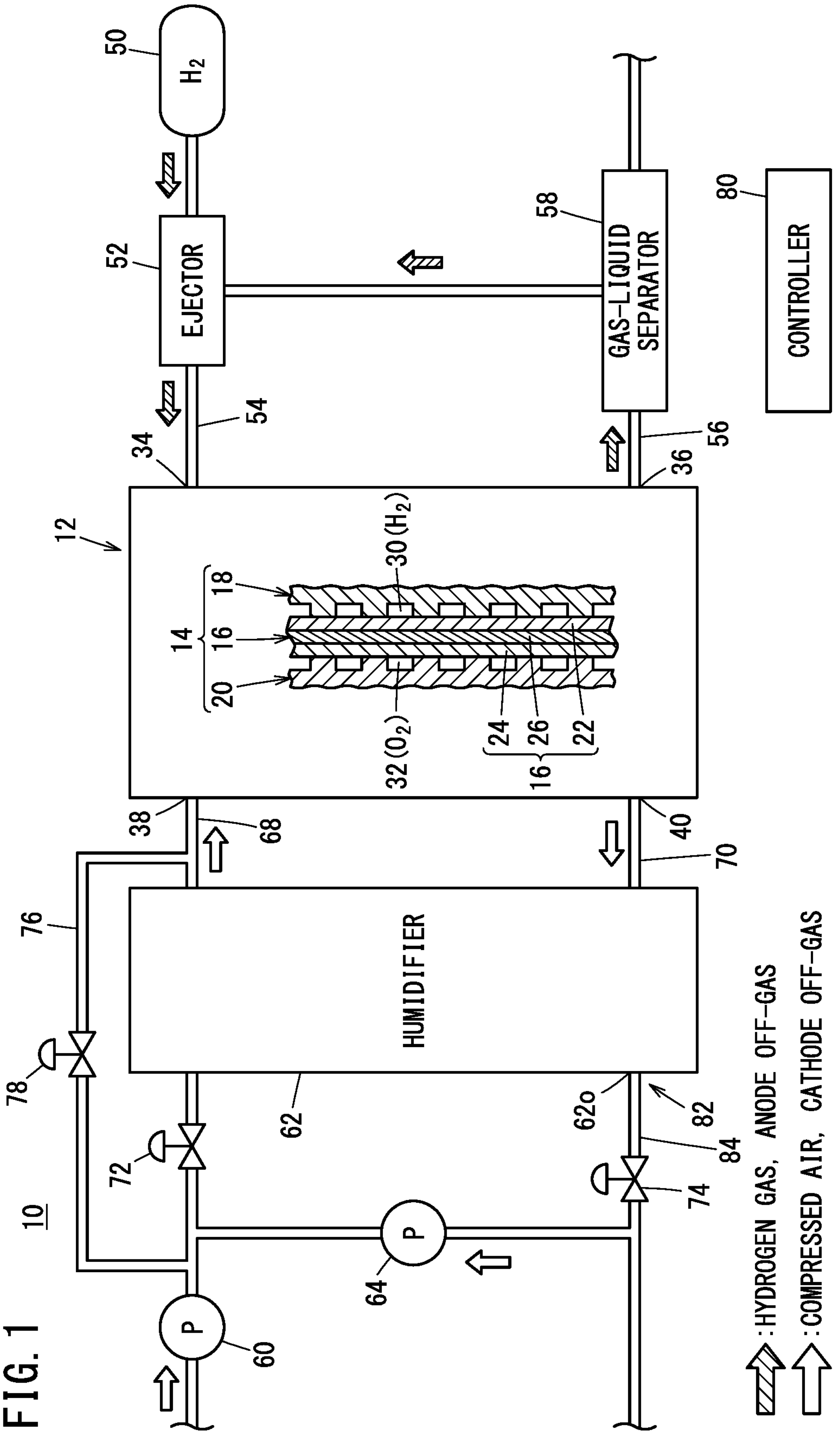
FIG. 1 is a schematic system diagram of a fuel cell system according to a first embodiment of the present invention.
Figure 7:
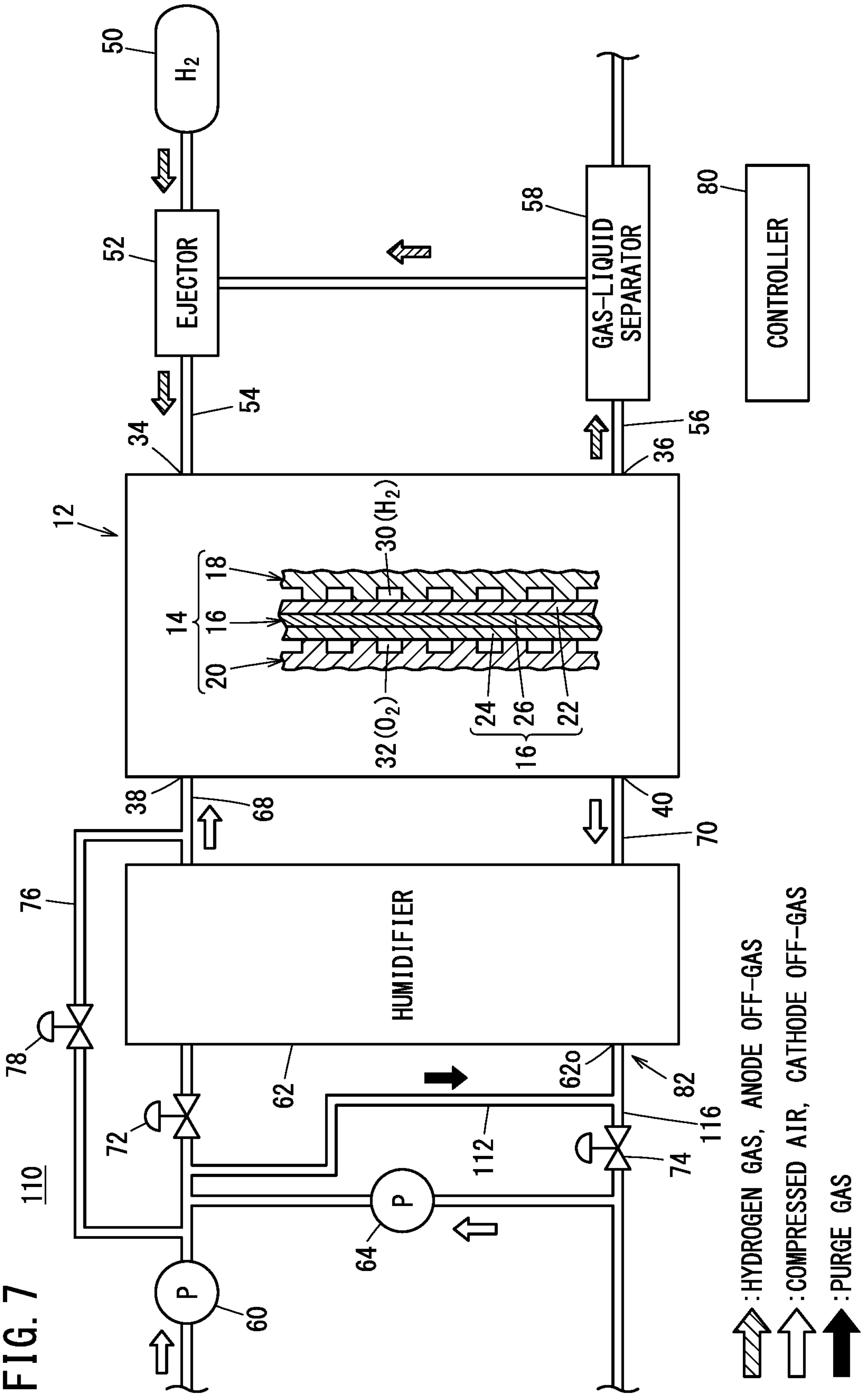
FIG. 7 is a schematic system diagram of a fuel cell system according to a second embodiment of the present invention.

In the following description, a fuel gas that has not been used in power generation and discharged from an anode 22 of a fuel cell stack 12 shown in FIG. 1 or 7 is referred to as an anode off-gas. An oxygen-containing gas that has not been used in power generation and discharged from a cathode 24 of the fuel cell stack 12 is referred to as a cathode off-gas. "Upstream" and "downstream" represent upstream and downstream in the flow direction of the oxygen-containing gas and the cathode off-gas, respectively. "High position" indicates a relatively higher level in the vertical direction, and "low position" indicates a relatively lower level in the vertical direction. The "high position" and the "low position" are not limited to the case where the components are aligned vertically.

First, with reference to FIG. 1, a description will be given concerning a fuel cell system 10 according to the first embodiment. FIG. 1 is simplified in order to facilitate understanding of the flows of the fuel gas and the oxygen-containing gas. Therefore, the directions shown in FIG. 1 do not necessarily coincide with the directions in the actual fuel cell system 10. In FIG. 1, valves other than a first on-off valve 72, a second on-off valve 74, and a bypass valve 78 are omitted. The same applies to the drawing of FIG. 7.

The fuel cell system 10 includes the fuel cell stack 12. A plurality of unit cells 14 are stacked in the fuel cell stack 12. The unit cell 14 is formed by sandwiching a membrane electrode assembly (MEA) 16 between a first separator 18 and a second separator 20. The MEA 16 is formed by sandwiching an electrolyte membrane 26 between the anode 22 and the cathode 24. The material of the first separator 18 and the second separator 20 is, for example, metal. The material of the electrolyte membrane 26 is, for example, a solid polymer such as perfluorosulfonic acid containing water.

A first gas flow field 30 is formed in the first separator 18. A hydrogen-containing gas (fuel gas) to be supplied to the anode 22 flows through the first gas flow field 30. A second gas flow field 32 is formed in the second separator 20. Compressed air (oxygen-containing gas) to be supplied to the cathode 24 flows through the second gas flow field 32. Between the unit cells 14 adjacent to each other, a coolant flow field (not shown) is formed by the first separator 18 of one unit cell 14 and the second separator 20 of the other unit cell 14. A coolant flows through the coolant flow field.

A hydrogen inlet 34 and a hydrogen outlet 36 are formed in the fuel cell stack 12. The hydrogen inlet 34 communicates with an inlet of the first gas flow field 30. The hydrogen outlet 36 communicates with an outlet of the first gas flow field 30. An air inlet 38 and an air outlet 40 are formed in the fuel cell stack 12. The air inlet 38 communicates with an inlet of the second gas flow field 32. The air outlet 40 communicates with an outlet of the second gas flow field 32.

The fuel cell system 10 includes a high-pressure tank 50 and an ejector 52. The high-pressure tank 50 is filled with the hydrogen gas. A first supply line 54 is provided between the high-pressure tank 50 and the fuel cell stack 12. The ejector 52 is provided on the first supply line 54 and supplies the hydrogen gas to the anode 22. The hydrogen gas sent from the ejector 52 flows toward the hydrogen inlet 34.

A gas-liquid separator 58 is connected to the fuel cell stack 12 via a first exhaust line 56. The anode off-gas discharged from the hydrogen outlet 36 is sent to the gas-liquid separator 58 via the first exhaust line 56. The anode off-gas is separated into hydrogen gas and water (liquid water) in the gas-liquid separator 58. The hydrogen gas thus separated is returned to the ejector 52 and then resupplied to the anode 22.

The fuel cell system 10 further includes an air pump 60, a humidifier 62, and a circulation pump 64. For example, the air pump 60 compresses the air to generate compressed air. The fuel cell stack 12 and the humidifier 62 are connected via a second supply line 68 and a second exhaust line 70. In the humidifier 62, water produced during power generation of the fuel cell stack 12 (produced water PW described later) is supplied to the compressed air provided by the air pump 60. As a result, the compressed air becomes humidified. The compressed air thus humidified flows toward the air inlet 38 via the second supply line 68. As described above, the second supply line 68 is an oxygen-containing gas supply line for supplying the compressed air (oxygen-containing gas). The circulation pump 64 may be omitted.

The cathode off-gas discharged from the air outlet 40 flows to the humidifier 62 via the second exhaust line 70. The produced water in the cathode off-gas is separated from the compressed air in the humidifier 62. The compressed air is resupplied to the cathode 24 by, for example, the circulation pump 64. On the other hand, the water is supplied to fresh compressed air from the air pump 60 as described above.

The first on-off valve 72 is provided upstream of the humidifier 62 in the second supply line 68. The second on-off valve 74 is provided downstream of the humidifier 62 in the second exhaust line 70.

A bypass line 76 branches off from the second supply line 68 and merges with the second supply line 68 on the downstream side of the humidifier 62. That is, the bypass line 76 bypasses the humidifier 62. The bypass line 76 is provided with a bypass valve 78.

The fuel cell system 10 is controlled by a controller 80. For example, the controller 80 individually switches each of the first on-off valve 72, the second on-off valve 74, and the bypass valve 78 from the open state to the closed state or from the closed state to the open state. The controller 80 can also individually maintain each of the first on-off valve 72, the second on-off valve 74, and the bypass valve 78 in either the open state or the closed state.

The fuel cell system 10 configured as described above is mounted on, for example, a body of an automobile.

Figure 2:
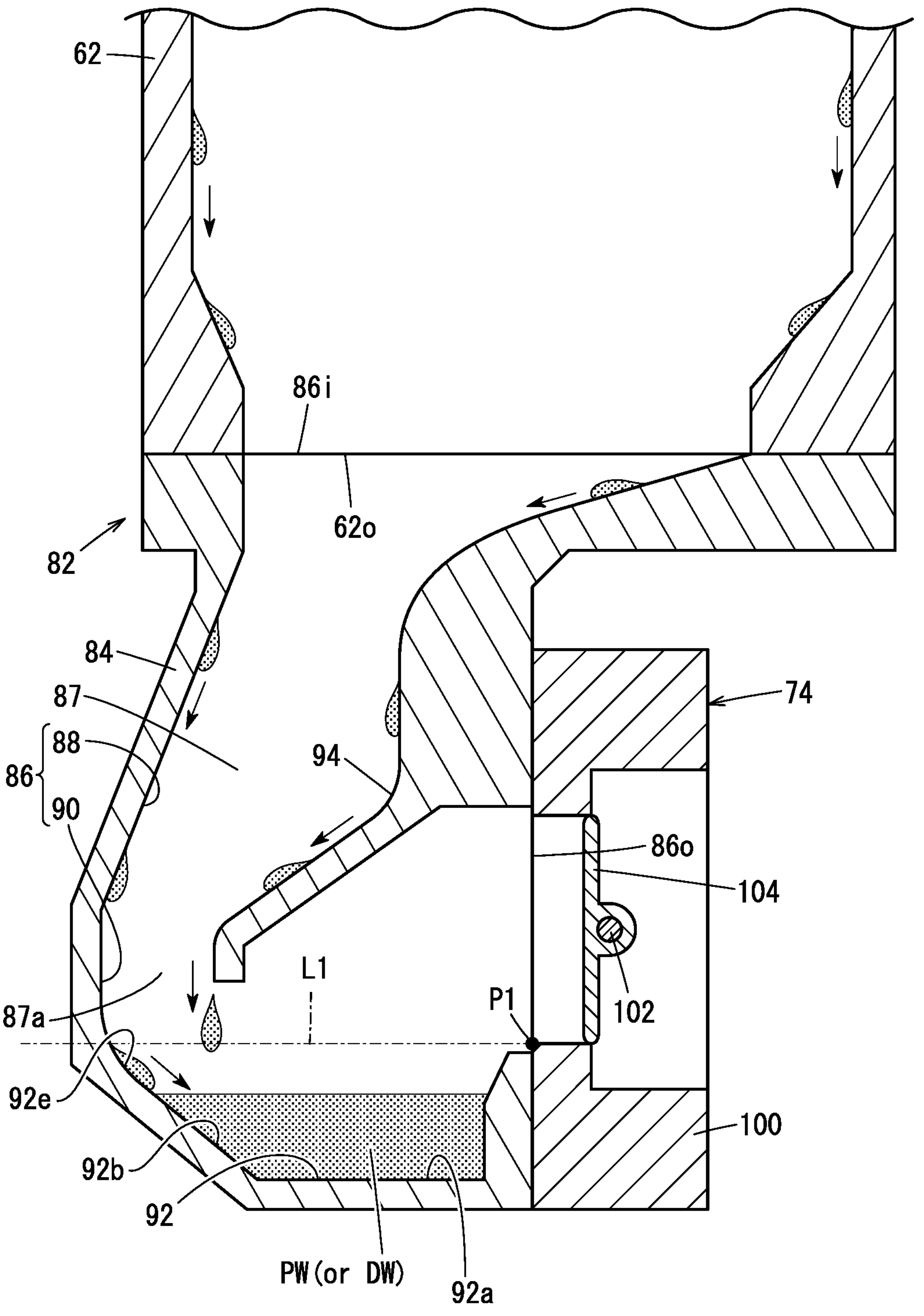
FIG. 2 is a schematic vertical cross-sectional view of a coupling structure between a humidifier and an on-off valve via a pipe.

FIG. 2 is a schematic vertical cross-sectional view of a coupling structure 82 that connects the discharge port (outlet **62*o*) of the humidifier 62 for the cathode off-gas to the second on-off valve 74. FIG. 2 shows the case where the fuel cell stack 12 is not in operation. The humidifier 62 and the second on-off valve 74 are connected via a coupling pipe 84. The coupling pipe 84 is a part of the second exhaust line 70**.

The up-down direction in FIG. 2 corresponds to the vertical direction. That is, the upper side in FIG. 2 corresponds to the upper side when the fuel cell system 10 is mounted on a vehicle body or the like. The lower side in FIG. 2 corresponds to the lower side when the fuel cell system 10 is mounted on the vehicle body or the like. As can be seen from FIG. 2, the outlet 62*o* of the humidifier 62 opens vertically downward.

An exhaust path 86 which is a flow passage is formed in the coupling pipe 84. An inlet 86*i* of the exhaust path 86 faces the outlet 62*o* of the humidifier 62, and is opened to extend horizontally. The exhaust path 86 includes a first flow passage 88 and a second flow passage 90. The first flow passage 88 is slightly inclined with respect to the vertical direction. The second flow passage 90 intersects the first flow passage 88 at a predetermined angle. Thus, the exhaust path 86 is bent in a substantially L-shape. Therefore, the outlet 86*o* of the exhaust path 86 (second flow passage 90) is opened to extend vertically. The lowest portion of the outlet 86*o* of the exhaust path 86 is the lowest point P1.

A recessed space continuous from the second flow passage 90 is formed below the second flow passage 90. The recessed space is a water trap 92 for retaining water. The water trap 92 is positioned lower than the lowest point P1. In FIG. 2, a boundary between the second flow passage 90 and the water trap 92 is indicated by a boundary L1. As understood from the above description, the water trap 92 is positioned at a lower level than the second flow passage 90 of the exhaust path 86 and communicates with the second flow passage 90.

A concave portion 94 recessed toward the second on-off valve 74 is formed in the middle of the first flow passage 88. A cross section of the concave portion 94 in a direction along the extending direction of the first flow passage 88 has a substantially triangular shape. The ridge on the lower side of the concave portion 94 extends to the vicinity of the boundary between the first flow passage 88 and the second flow passage 90. Therefore, the cross-sectional area of the first flow passage 88 is large at the valley of the concave portion 94 and is small in the vicinity of the boundary between the first flow passage 88 and the second flow passage 90. In other words, the cross-sectional area of the first flow passage 88 is large at an upstream portion away from the water trap 92 and small at a downstream portion close to the water trap 92. As described above, the exhaust path 86 has a portion in which the cross-sectional area decreases toward the water trap 92 (cross-sectional area changing region 87).

The downstream end of the cross-sectional area changing region 87 is a throttle portion 87*a* having the smallest cross-sectional area in the cross-sectional area changing region 87. The throttle portion 87*a* is positioned above the water trap 92 and faces the water trap 92. The water trap 92 has an end 92*e* on the side away from the outlet 86*o* of the exhaust path 86. The throttle portion 87*a* faces the end 92*e* of the water trap 92. The water trap 92 has a bottom 92*a* that is the lowest position in the water trap 92 and a slope 92*b* that is inclined toward the bottom 92*a*. The bottom 92*a* is provided closer to the outlet 86*o* than the slope 92*b*. The slope 92*b* faces a lower part of the throttle portion 87*a*. An end of the slope 92*b* is the end 92*e*. Incidentally, the cross-sectional area of the first flow passage 88 is a cross-sectional area in a direction orthogonal to the flow direction of the cathode off-gas.

The second on-off valve 74 is provided on the outlet 86*o* of the exhaust path 86 (second flow passage 90). The second on-off valve 74 is a so-called butterfly valve, and includes a housing 100, a rotary shaft 102, and a valve body 104. The housing 100 is connected to the coupling pipe 84 via bolts or the like (not shown). The rotary shaft 102 is rotatably supported by the housing 100. The valve body 104 is provided on the rotary shaft 102 and rotates integrally with the rotary shaft 102.

The position of the valve body 104 of the second on-off valve 74 is substantially equal to the position of the outlet 86*o* of the exhaust path 86 in the vertical direction. That is, the second on-off valve 74 is disposed at a higher position than the water trap 92.

The fuel cell system 10 according to the first embodiment is basically configured in the manner described above. Next, operations and advantageous effects of the fuel cell system 10 will be described.

The fuel cell system 10 is mounted, for example, on the body of the automobile. The fuel cell system 10 is activated to drive the automobile. At this time, the hydrogen gas is supplied from the high-pressure tank 50 to the fuel cell stack 12 via the first supply line 54 based on a command signal from the controller 80 (see FIG. 1). In addition, the controller 80 opens the first on-off valve 72 and the second on-off valve 74 and closes the bypass valve 78 using command signals. That is, the second supply line 68 and the second exhaust line 70 are opened.

Figure 3:
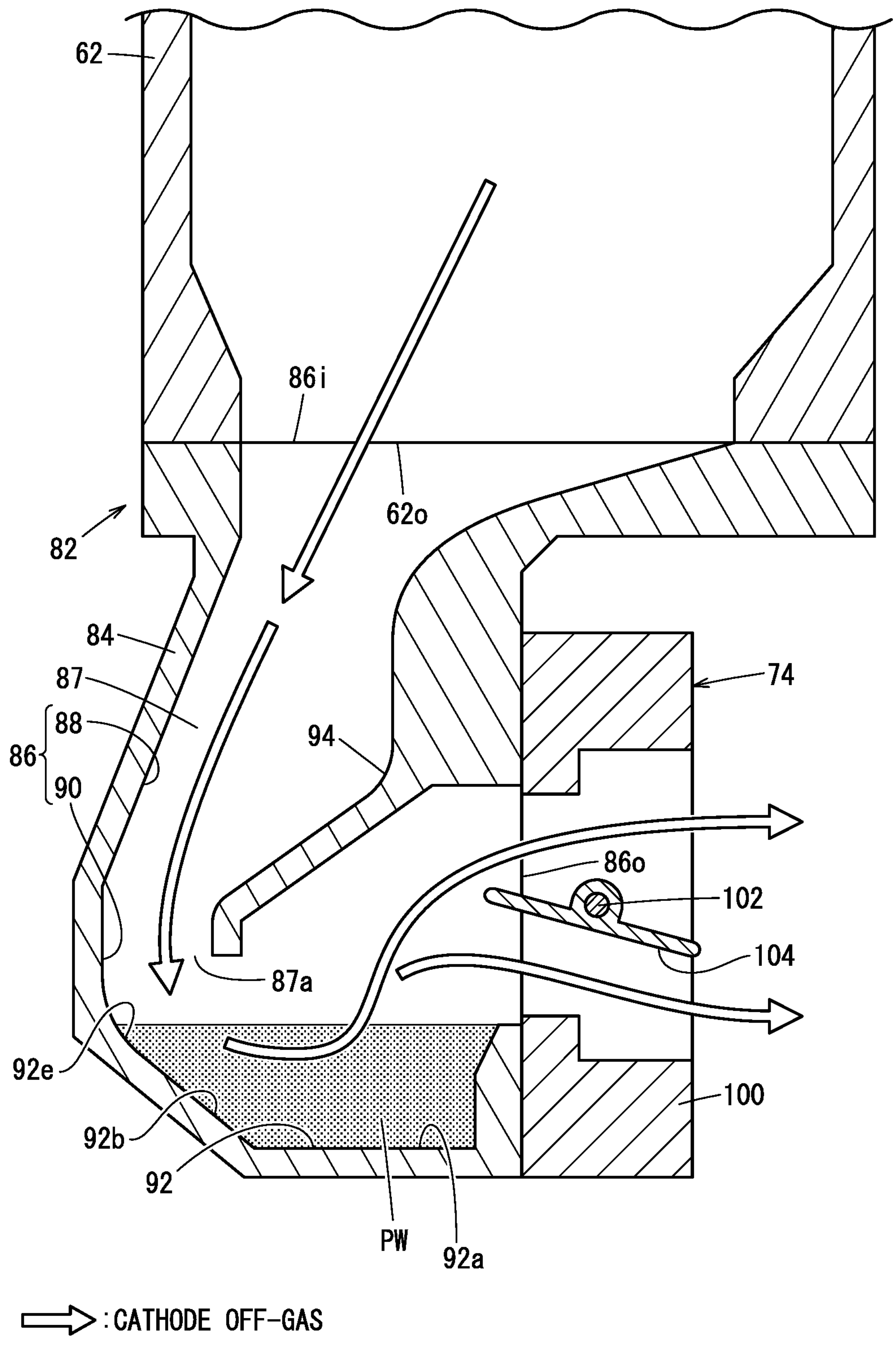
FIG. 3 is a schematic vertical cross-sectional view of the coupling structure while the fuel cell stack is in operation.

The second on-off valve 74 in the open state is shown in FIG. 3. At this time, the rotary shaft 102 and the valve body 104 rotate integrally to open the outlet 86*o* of the exhaust path 86. Therefore, the cathode off-gas can flow from the humidifier 62 toward the circulation pump 64.

The hydrogen gas passes through the ejector 52 and flows into the first gas flow field 30 from the hydrogen inlet 34. While flowing through the first gas flow field 30, the hydrogen gas comes into contact with the anode 22 to cause oxidation reactions. The hydrogen gas that has not been used (anode off-gas) contains water and is discharged from the first gas flow field 30 to the first exhaust line 56 via the hydrogen outlet 36.

Thereafter, the water and the hydrogen gas in the anode off-gas are separated in the gas-liquid separator 58. The hydrogen gas, the humidity of which is lowered, flows to the ejector 52. In the ejector 52, the new hydrogen gas supplied from the high-pressure tank 50 merges with the hydrogen gas discharged from the gas-liquid separator 58. The merged hydrogen gas flows into the first gas flow field 30 through the same path as described above. Thereafter, the above-described circulation is repeated.

On the other hand, compressed air is supplied from the air pump 60 to the fuel cell stack 12 via the second supply line 68. The compressed air flows through the humidifier 62. At this time, the water content of the compressed air is increased. That is, the humidity of the compressed air increases. The compressed air flows into the second gas flow field 32 from the air inlet 38. While flowing through the second gas flow field 32, oxygen in the compressed air comes into contact with the cathode 24 to cause reduction reactions. In the reduction reactions, water is produced. This water is the produced water PW shown in FIG. 3.

The produced water PW is discharged from the second gas flow field 32 to the second exhaust line 70 via the air outlet 40 together with the compressed air that has not been used (cathode off-gas). The cathode off-gas containing the produced water PW flows into the humidifier 62. In the humidifier 62, when the cathode off-gas passes through the porous membrane (not shown), the compressed air is separated from the produced water PW. That is, the humidity of the compressed air decreases. All or part of the compressed air is returned to the humidifier 62 by the circulation pump 64 (see FIG. 1). On the way, the compressed air merges with new compressed air fed by the air pump 60. The merged compressed air flows into the humidifier 62. At this time, the produced water PW is supplied to the compressed air to increase the water content of the compressed air in the same manner as described above. The compressed air, the water content of which is increased, flows into the second gas flow field 32 through the same path as described above. Thereafter, the above-described circulation is repeated.

The cathode off-gas discharged from the outlet 62*o* (see FIG. 3) of the humidifier 62 flows through the exhaust path 86 of the coupling pipe 84. Here, the cathode off-gas contains the produced water PW as described above. The produced water PW condensed on, for example, the inner wall of the first flow passage 88 or the second flow passage 90, becomes droplets, and moves downward. Since the second flow passage 90 communicates with the water trap 92, the produced water PW is collected in the water trap 92. Thus, the produced water PW is retained in the water trap 92. When the amount of the produced water PW retained in the water trap 92 exceeds the maximum capacity of the water trap 92, the excess of the produced water PW overflows through the second on-off valve 74 which maintains the open state.

Figure 4:
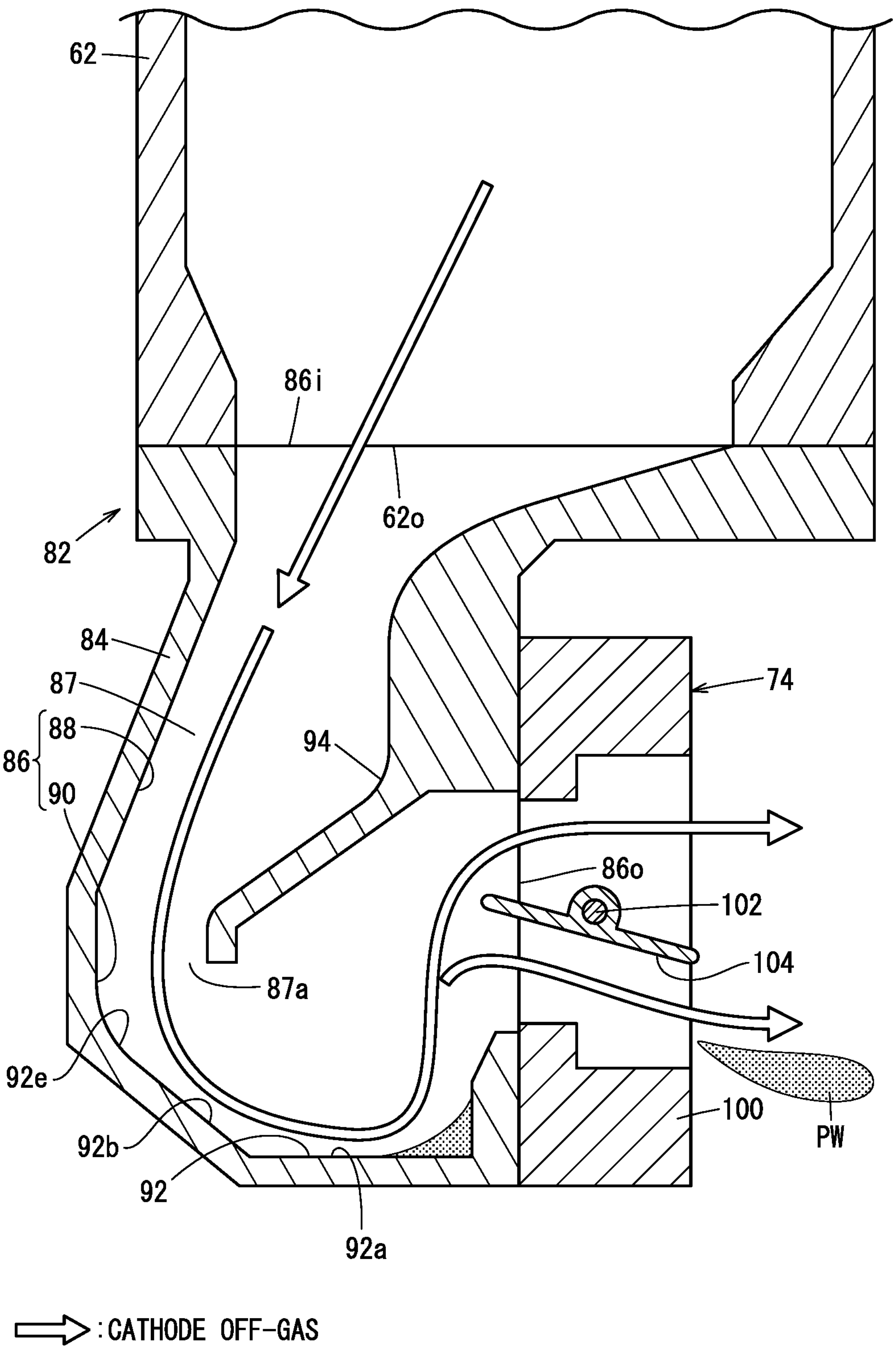
FIG. 4 is a schematic vertical cross-sectional view of the coupling structure immediately after the operation of the fuel cell stack is stopped.

When the operation of the automobile is stopped due to parking or the like, the operation of the fuel cell system 10 is also stopped. At this time, the controller 80 closes the first on-off valve 72 and opens the bypass valve 78 (see FIG. 1). Further, the controller 80 continues the operation of the air pump 60 and maintains the open state of the second on-off valve 74. Therefore, the compressed air supplied from the air pump 60 passes through the bypass line 76 and the second gas flow field 32, and flows into the humidifier 62 from the second exhaust line 70. As shown in FIG. 4, the compressed air flows into the exhaust path 86 of the coupling pipe 84 via the outlet 62*o* without being humidified in the humidifier 62.

As described above, the cross-sectional area of the first flow passage 88 of the exhaust path 86 becomes smaller on the downstream side (throttle portion 87*a*) close to the water trap 92. The inlet from the first flow passage 88 to the second flow passage 90 has a nozzle shape formed by the throttle portion 87*a*. Therefore, the flow velocity of the compressed air flowing into the second flow passage 90 is greater than the flow velocity of the compressed air flowing through the first flow passage 88. Since the second flow passage 90 communicates with the water trap 92, the compressed air flowing into the second flow passage 90 at an increased flow velocity is guided by the slope 92*b* to flow into the water trap 92. As a result, as shown in FIG. 4, the compressed air blows off (purges) the produced water PW retained in the water trap 92 toward the outlet 86*o*. Since the flow velocity of the compressed air flowing into the second flow passage 90 is sufficiently increased, most of the produced water PW retained in the water trap 92 is discharged from the water trap 92 via the second on-off valve 74. As described above, according to the first embodiment, the amount of the produced water PW retained in the water trap 92 can be reduced.

The compressed air and the produced water PW are discharged from the second on-off valve 74 which maintains the open state. The compressed air is returned to the bypass line 76 by the circulation pump 64, for example, and is resupplied to the second gas flow field 32. Alternatively, the compressed air is released to the atmosphere. The produced water PW is discharged, for example, to the atmosphere.

Figure 5:
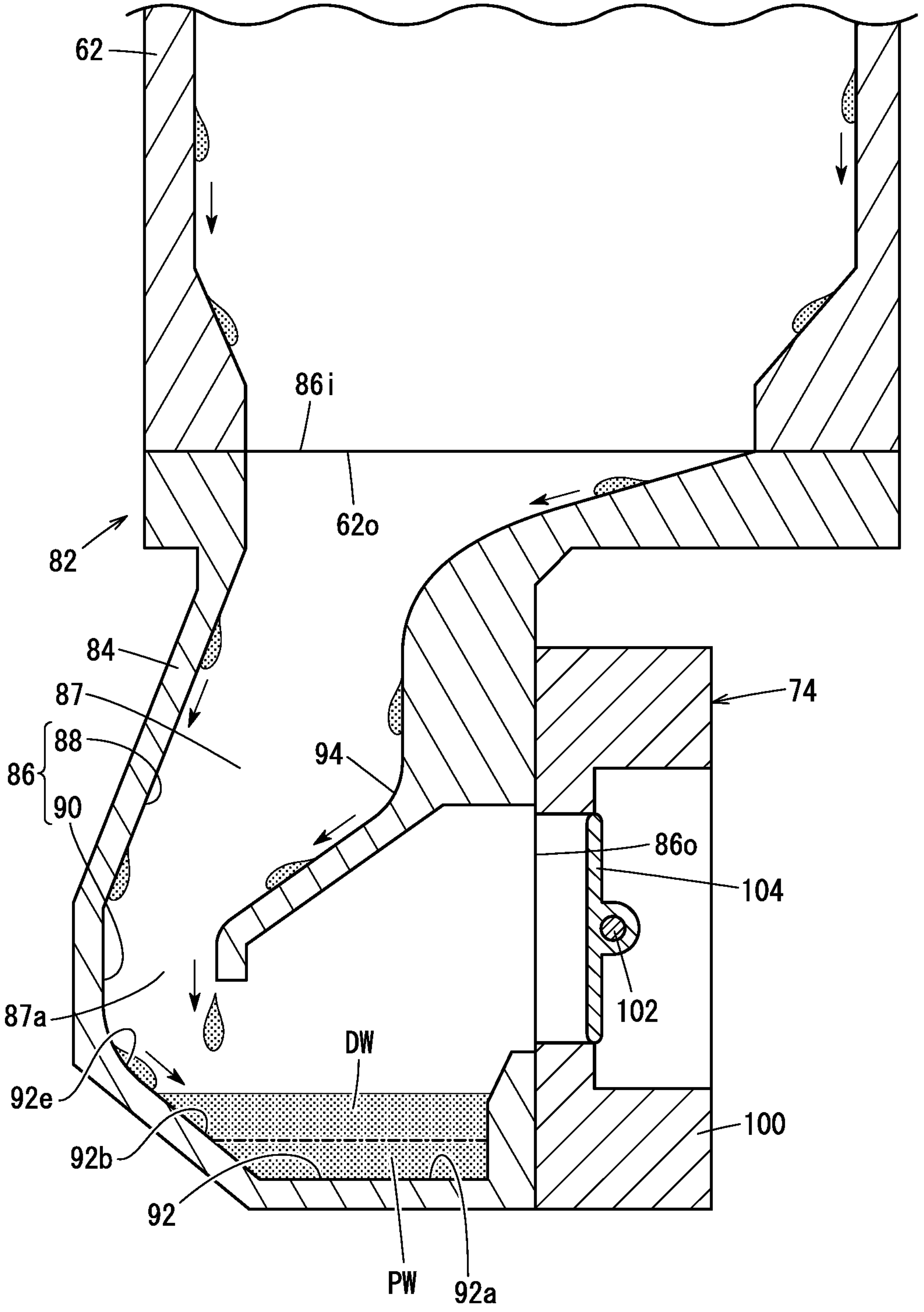
FIG. 5 is a schematic vertical cross-sectional view of the coupling structure while the fuel cell stack is not in operation.

After the predetermined time has elapsed since the operation of the fuel cell system 10 is stopped, the controller 80 closes the bypass valve 78 and the second on-off valve 74. As a result, the fuel cell stack 12 is placed in a non-operation state. While the fuel cell stack 12 is not in operation, as shown in FIG. 5, the water vapor remaining inside the humidifier 62 condenses. Further, the water vapor remaining in the exhaust path 86 of the coupling pipe 84 also condenses. Liquid water (dew condensation water DW) generated by the condensation is retained in the water trap 92 in the same manner as described above. At this time point, most of the produced water PW has already been discharged from the water trap 92 as shown in FIG. 4. Therefore, a sufficient water storage capacity of the water trap 92 is ensured. As a result, even if the amount of the dew condensation water DW is added, the amount of water inside the water trap 92 does not exceed the maximum volume of the water trap 92, and thus the liquid surface of the dew condensation water DW is prevented from becoming above the lowest point P1.

That is, the dew condensation water DW is prevented from contacting the valve body 104. Therefore, even when the outside air temperature drops below the freezing point and the dew condensation water DW freezes, the valve body 104 can be prevented from being stuck to the housing 100 or the like due to the freezing of the dew condensation water DW.

When the fuel cell system 10 is started up under a situation where freezing is predicted, such as when the outside air temperature is below the freezing point, the controller 80 performs a warm-up operation. Specifically, the controller 80 controls hydrogen gas supply to the fuel cell stack 12 via the first supply line 54 and compressed air supply to the fuel cell stack 12 via the second supply line 68. At this time, the controller 80 causes the fuel cell stack 12 to generate electric power at a low current density. Therefore, the amounts of anode off-gas and cathode off-gas generated are relatively small.

As the fuel cell stack 12 generates electric power, the temperature of the cathode off-gas increases. The cathode off-gas flows into the exhaust path 86 of the coupling pipe 84 via the outlet 62*o* of the humidifier 62. The cathode off-gas comes into contact with the dew condensation water DW in the water trap 92. For this reason, in the case where the dew condensation water DW in the water trap 92 is frozen, the dew condensation water DW defrosts. This is because heat is transferred from the cathode off-gas to the dew condensation water DW. Even in the case where the valve body 104 is stuck to the housing 100 or the like due to the freezing of the dew condensation water DW, the dew condensation water DW defrosts. Therefore, at this point of time, the second on-off valve 74 is opened.

Figure 6:
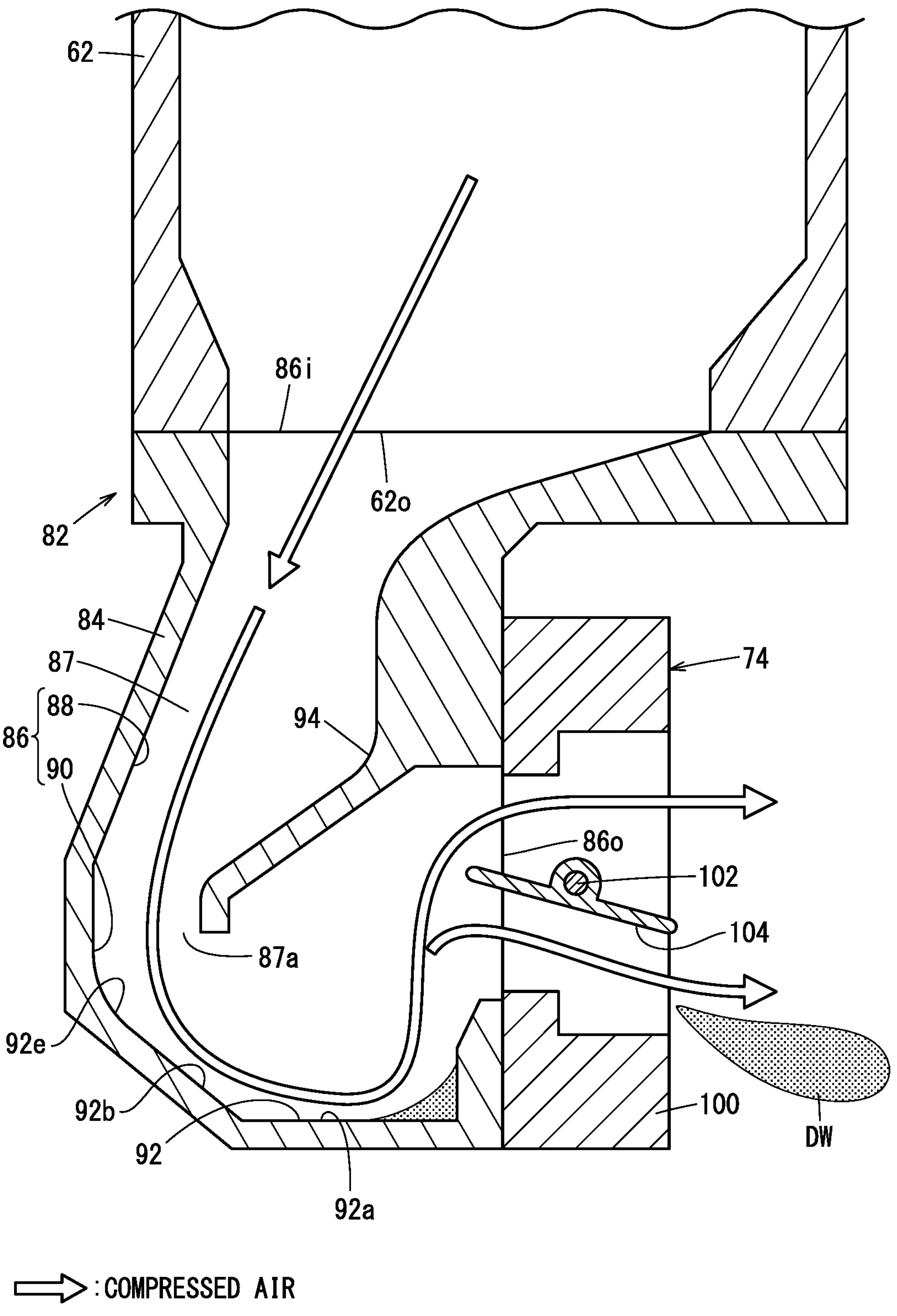
FIG. 6 is a schematic vertical cross-sectional view of the coupling structure immediately after the operation of the fuel cell stack is started.

As shown in FIG. 6, the defrosted dew condensation water DW in the liquid phase is blown off by the cathode off-gas flowing into the second flow passage 90. For the same reason as described above, the flow velocity of the cathode off-gas flowing into the second flow passage 90 is sufficiently increased. Accordingly, most of the dew condensation water DW is discharged from the water trap 92 via the second on-off valve 74. As described above, according to the first embodiment, it is possible to prevent the second on-off valve 74 from becoming inoperable due to freezing. Further, even if freezing occurs, the second on-off valve 74 can be quickly brought into an operable state.

Next, with reference to FIGS. 7 to 10, a description will be given concerning a fuel cell system 110 according to a second embodiment. Moreover, it should be noted that the same reference numerals designate the same constituent elements as those shown in FIGS. 1 to 6, and detailed description of these elements will be omitted.

The fuel cell system 110 includes a purge gas supply line 112 shown in FIG. 7. The purge gas supply line 112 is branched from the second supply line 68 at a position upstream of the first on-off valve 72. The purge gas supply line 112 extends toward the coupling pipe 116 constituting the coupling structure 114 shown in FIG. 8. The compressed air branched from the second supply line 68 flows through the purge gas supply line 112.

Figure 8:
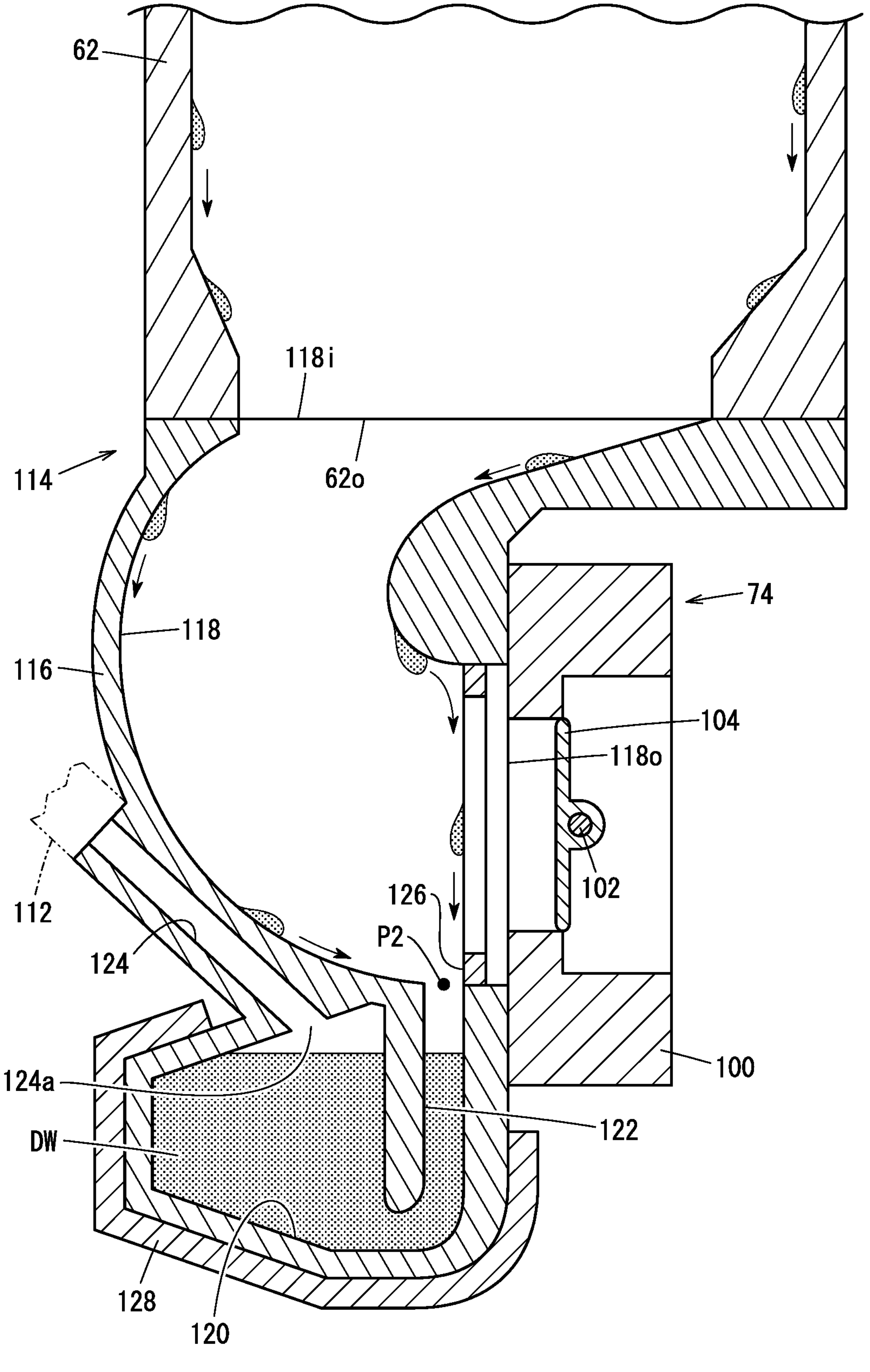
FIG. 8 is a schematic vertical cross-sectional view of the coupling structure while the fuel cell stack is not in operation.

As shown in FIG. 8, the humidifier 62 and the second on-off valve 74 are connected via the coupling pipe 116. The coupling pipe 116 is a part of the second exhaust line 70. FIG. 8 shows the case where the fuel cell stack 12 is not in operation.

The up-down direction in FIG. 8 corresponds to the vertical direction. That is, the upper side in FIG. 8 corresponds to the upper side when the fuel cell system 110 is mounted on a vehicle body or the like. The lower side in FIG. 8 corresponds to the lower side when the fuel cell system 110 is mounted on the vehicle body or the like. As in FIG. 2, the outlet 62*o* of the humidifier 62 opens vertically downward.

An exhaust path 118 which is a flow passage is formed in the coupling pipe 116. An inlet 118*i* of the exhaust path 118 faces the outlet 62*o* of the humidifier 62, and is opened to extend horizontally. The exhaust path 118 is curved in a C shape. Therefore, the outlet 118*o* of the exhaust path 118 is opened to extend vertically. The lowest portion of the exhaust path 118 is the lowest point P2.

A water trap 120 is formed below the exhaust path 118. That is, the water trap 120 is disposed at a lower position than the exhaust path 118. The uppermost point of the water trap 120 is positioned lower than the lowest point P2 of exhaust path 118. The water trap 120 is formed in the coupling pipe 116 as a space branched from the exhaust path 118. The water trap 120 communicates with the exhaust path 118 via a communication path 122. To be specific, the communication path 122 extends from the bottom of the water trap 120 to the vicinity of the outlet 118*o* of the exhaust path 118. The cross-sectional area of the communication path 122 is smaller than the cross-sectional area of the exhaust path 118. Here, the cross-sectional areas of the exhaust path 118 and the communication path 122 are cross-sectional areas in a direction orthogonal to the fluid flow direction. The volume of the water trap 120 is larger than the volume of the communication path 122.

A purge gas supply path 124 is formed in the coupling pipe 116. The purge gas supply path 124 extends, for example, toward the upper portion of the water trap 120 from the vicinity of the middle of the curved portion of the exhaust path 118. An outlet 124*a* (downstream end) of the purge gas supply path 124 is connected to an upper portion of the water trap 120. A purge gas supply line 112 is connected to the purge gas supply path 124 via a joint member (not shown). In this way, the compressed air as the purge gas can be supplied to the water trap 120 via the purge gas supply line 112 and the purge gas supply path 124. The pressure of the compressed air flowing through the purge gas supply path 124 is higher than the pressure of the cathode off-gas flowing through the exhaust path 118.

A ring member 126 is positioned and fixed in the vicinity of the outlet 118*o* of the exhaust path 118. The ring member 126 is disposed downstream of the communication path 122 in the flow direction of the purge gas. The ring member 126 protrudes inward from the inner wall of the exhaust path 118. The surface of the ring member 126 facing the inside of the coupling pipe 116 (upstream in the flow direction of the cathode off-gas) serves as a guide wall that guides the dew condensation water DW to the communication path 122. Instead of the ring member 126, an arc-shaped member having a C shape (snap ring shape) may be used. In this case, the opening of the C shape is directed vertically downward.

To the coupling pipe 116, a heater 128 which is a heating unit is attached at a position outside the portion where the water trap 120 is formed. When the heater 128 is in the ON state, the water trap 120 is heated.

The second on-off valve 74 is provided on the outlet 118*o* of the exhaust path 118. That is, the humidifier 62 and the second on-off valve 74 are coupled to each other via the coupling pipe 116. The position of the valve body 104 of the second on-off valve 74 is substantially equal to the position of the outlet 118*o* of the exhaust path 118 in the vertical direction. In other words, the valve body 104 is disposed higher than the water trap 120.

The fuel cell system 110 is activated to drive the automobile, for example. When the outside air temperature at the time of activation is, for example, below the freezing point or slightly above the freezing point, the controller 80 (see FIG. 1) determines that "freezing of the dew condensation water DW in the coupling structure 114 is predictable". In this case, the controller 80 turns on the heater 128. If the dew condensation water DW is frozen, the dew condensation water DW is defrosted by the heater 128. On the other hand, when the outside air temperature is equal to or higher than 10° C., for example, the controller 80 determines that "freezing of the dew condensation water DW in the coupling structure 114 will not happen". In this case, the controller 80 keeps the heater 128 turned-off.

Meanwhile, the hydrogen gas is supplied from the high-pressure tank 50 to the fuel cell stack 12 via the first supply line 54 based on a command signal from the controller 80. Further, the controller 80 brings the first on-off valve 72 and the second on-off valve 74 into the open state by command signals. Since the dew condensation water DW is in the liquid phase in the coupling structure 114, the second on-off valve 74 is easily brought into the open state. Thus, the second supply line 68, the second exhaust line 70, and the purge gas supply line 112 are opened. Accordingly, the compressed air is supplied to the cathode 24 through the second supply line 68. The cathode off-gas is discharged from the cathode 24 to the second exhaust line 70.

Figure 9:
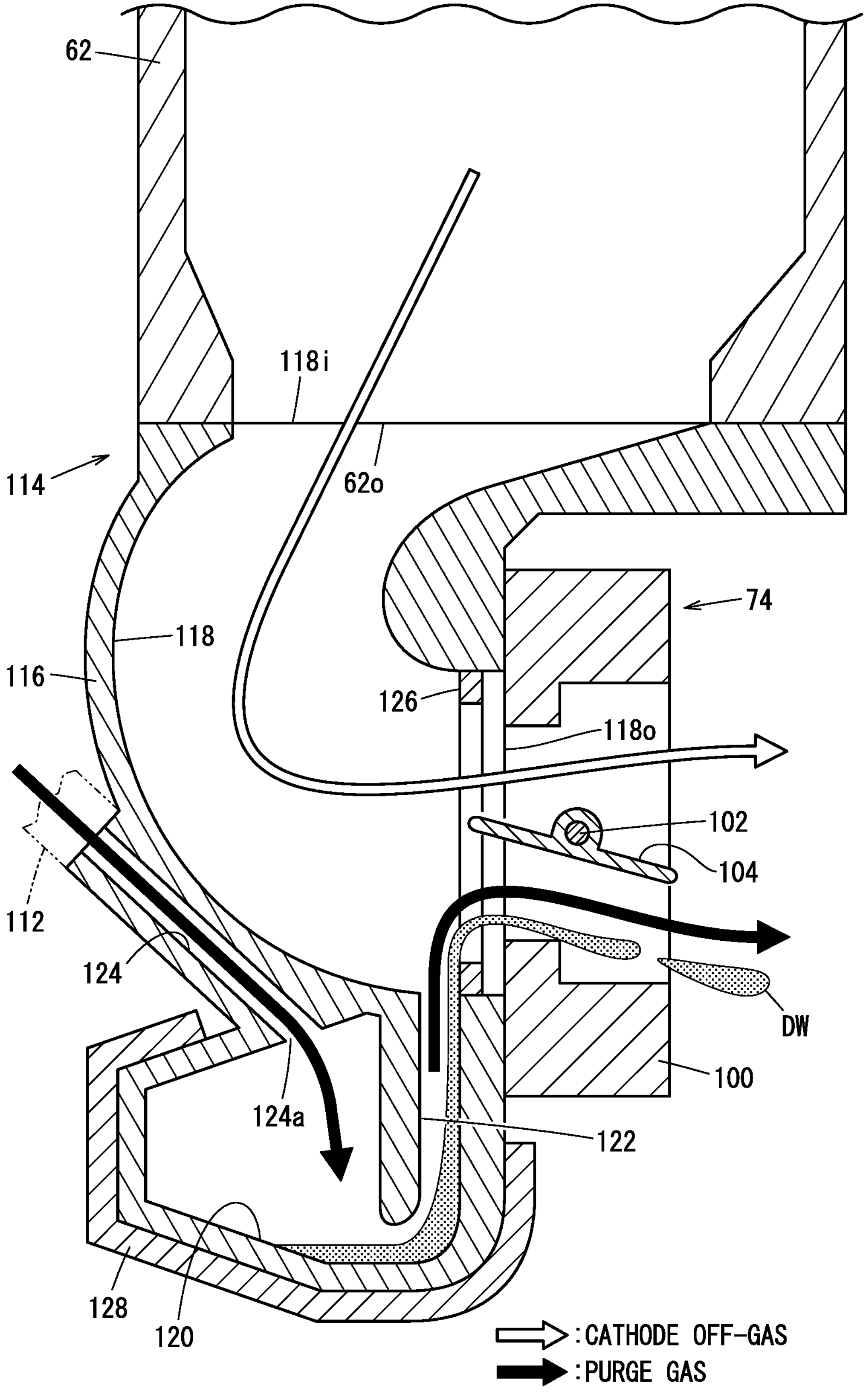
FIG. 9 is a schematic vertical cross-sectional view of the coupling structure immediately after the operation of the fuel cell stack is started.

The second on-off valve 74 in the open state is shown in FIG. 9. At this time, the rotary shaft 102 and the valve body 104 rotate integrally to open the outlet 118*o* of the exhaust path 118. Therefore, the cathode off-gas can flow from the humidifier 62 toward the circulation pump 64.

Further, a part of the compressed air flowing through the second supply line 68 is branched to the purge gas supply line 112. The compressed air flows through the purge gas supply line 112 and is supplied to the purge gas supply path 124 as a purge gas as shown in FIG. 9. The purge gas flows into the water trap 120 from the outlet 124*a* of the purge gas supply path 124. The purge gas presses the dew condensation water DW retained in the water trap 120 from above. As a result, the dew condensation water DW pressed by the purge gas is blown off from the water trap 120 and is discharged through the second on-off valve 74 in the open state. As a result, the amount of water retained in the water trap 120 becomes substantially 0.

Figure 10:
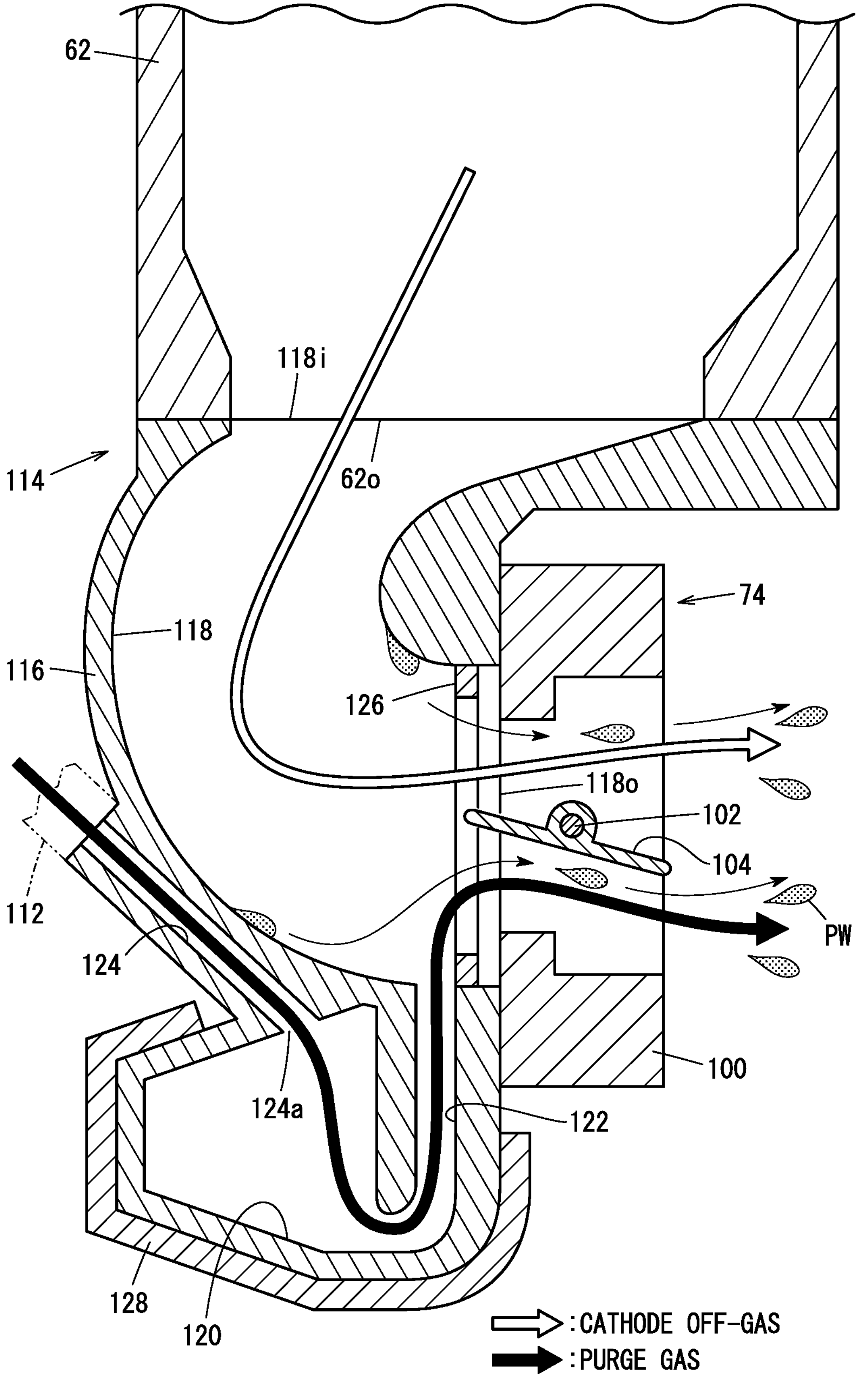
FIG. 10 is a schematic vertical cross-sectional view of the coupling structure while the operation of the fuel cell stack is in operation.

Thereafter, the fuel cell stack 12 is operated in the same manner as in the first embodiment. During this time, as shown in FIG. 10, the purge gas is supplied to the water trap 120 via the purge gas supply line 112 and the purge gas supply path 124. That is, the purge gas is continuously supplied to the water trap 120 from the activation of the fuel cell stack 12. The purge gas flows out from the water trap 120 to the exhaust path 118 via the communication path 122.

Thereafter, the purge gas is discharged from the exhaust path 118 via the outlet 118*o* of the exhaust path 118 and the second on-off valve 74.

The purge gas discharged from the communication path 122 functions as an air curtain of the communication path 122. Therefore, the produced water PW contained in the cathode off-gas is prevented from entering the water trap 120 from the communication path 122. The produced water PW is discharged from the exhaust path 118 via the second on-off valve 74 together with the cathode off-gas. Therefore, the produced water PW is hardly retained in the water trap 120.

When the operation of the automobile is stopped due to parking or the like, the operation of the fuel cell system 110 is also stopped. At this time, the controller 80 closes the first on-off valve 72 and the second on-off valve 74. Further, the controller 80 stops the operation of the air pump 60 and the circulation pump 64. That is, in the second embodiment, after the operation of the fuel cell system 110 is stopped, the water trap 120 is not purged.

When the fuel cell system 110 is stopped, the fuel cell stack 12 is placed into the non-operation state. While the fuel cell stack 12 is not in operation, as shown in FIG. 8, the water vapor remaining inside the humidifier 62 condenses. Further, the water vapor remaining in the exhaust path 118 of the coupling pipe 116 also condenses. Liquid water generated by condensation (dew condensation water DW) moves to the opening of the communication path 122 along the inner wall of the exhaust path 118 or the one end surface of the ring member 126. The dew condensation water DW further flows into the water trap 120 via the communication path 122. Thus, the dew condensation water DW is collected in the water trap 120.

As described above, during the operation of the fuel cell system 110, most of the produced water PW is discharged from the second on-off valve 74 together with the cathode off-gas (see FIG. 10). That is, also in the second embodiment, a sufficient water storage capacity of the water trap 120 is ensured. As a result, even if the amount of the dew condensation water DW is added, the amount of water inside the water trap 120 does not exceed the maximum volume of the water trap 120, and thus the exhaust path 118 is prevented from flooded with the dew condensation water DW from the communication path 122. The liquid surface of the dew condensation water DW is prevented from becoming above the lowest point P2.

That is, the dew condensation water DW is prevented from contacting the valve body 104 in the second embodiment as well. Therefore, even when the outside air temperature drops below the freezing point and the dew condensation water DW freezes, the valve body 104 can be prevented from being stuck to the housing 100 or the like due to the freezing of the dew condensation water DW.

In the first embodiment and the second embodiment described above, the case where the coupling structure 82 and the coupling structure 114 are provided in the second on-off valve 74 is illustrated. However, the coupling structure 82 or the coupling structure 114 may be provided in the first on-off valve 72. The coupling structure 82 or the coupling structure 114 may be provided in both the first on-off valve 72 and the second on-off valve 74. Further, for example, the coupling structure 82 may be provided in the first on-off valve 72 and the coupling structure 114 may be provided in the second on-off valve 74, or conversely, the coupling structure 114 may be provided in the first on-off valve 72 and the coupling structure 82 may be provided in the second on-off valve 74.

As described above, the present embodiment discloses a fuel-cell system (10) including: the fuel cell stack (12); the humidifier (62) to which the oxygen-containing gas to be supplied to the cathode (24) of the fuel cell stack and the cathode off-gas discharged from the fuel cell stack are introduced; the pipe (84) having the flow passage (86) through which either the oxygen-containing gas having flowed through the humidifier or the cathode off-gas having flowed through the humidifier flows; the on-off valve (74) provided at the outlet (86*o*) of the flow passage and configured to open the flow passage while the fuel cell stack is in operation and close the flow passage while the fuel cell stack is not in operation; and the water trap (92) communicating with the flow passage, wherein with high or low defined using a vertical direction as a reference, the water trap is positioned lower than the flow passage and the on-off valve is positioned higher than the water trap.

While the fuel cell stack is not in operation, water content in the oxygen-containing gas or the cathode off-gas condenses. Since the water trap is arranged at a lower position than the flow passage, the dew condensation water flows into the water trap by gravity. In other words, the dew condensation water is collected in the water trap. Here, since the on-off valve is disposed at a higher position than the water trap, it is difficult for the dew condensation water collected in the water trap to move to the on-off valve against gravity without any help from others. Therefore, the dew condensation water is prevented from coming into contact with the on-off valve.

Therefore, even in an environment where there is a possibility of freezing as in a case where the outside temperature is below the freezing point, there is no concern that the water adhering to the on-off valve will freeze. Therefore, even in the case where the fuel cell system is activated under the outside temperature below the freezing point, the on-off valve can be quickly opened and closed.

The present embodiment discloses the fuel cell system in which the water trap is formed in the pipe as a recessed space connected from the flow passage, the water trap is positioned lower than the lowest position of the outlet of the flow passage, and the flow passage has the portion (87) on the upstream side of the water trap, the portion (87) having the cross-sectional area decreasing toward the water trap.

In this case, for example, immediately after the operation of the fuel cell stack is started, the produced water remaining in the water trap can be blown off (purged) by the cathode off-gas. In addition, since the flow passage has a portion in which the cross-sectional area decreases toward the water trap, the flow velocity of the cathode off-gas increases. Therefore, a large amount of produced water can be easily discharged from the water trap. Thus, the water storage capacity of the water trap is ensured.

The present embodiment discloses the fuel cell system in which the water trap is formed so as to branch from the flow passage, and the communication path (122) that allows the flow passage and the water trap to communicate with each other and the purge gas supply path (124) for supplying a purge gas to the water trap are formed in the pipe.

In this case, the purge gas can function as an air curtain for the communication path. Therefore, for example, while the fuel cell stack is in operation, the produced water can be discharged from the flow passage via the on-off valve and prevented from flowing into the water trap through the communication path. Therefore, it is possible to prevent the produced water from being retained in the water trap while the fuel cell stack is in operation. As a result, the water storage capacity of the water trap is ensured, so that the dew condensation water generated while the fuel cell stack is not in operation can be sufficiently caught in the water trap.

The present embodiment discloses the fuel cell system including: the oxygen-containing gas supply line (68) through which the oxygen-containing gas is supplied to the cathode; and the purge gas supply line (112) branching off from the oxygen-containing gas supply line and connected to the purge gas supply path, wherein the part of the oxygen-containing gas flowing through the oxygen-containing gas supply line is supplied to the water trap as the purge gas via the purge gas supply line.

According to this configuration, a part of the oxygen-containing gas can be supplied to the water trap as the purge gas. Therefore, the purge gas supply source and the oxygen-containing gas supply source can be made common. In other words, there is no need to separately provide a purge gas supply source. Therefore, even when the purge gas is supplied to the water trap, the configuration of the fuel cell system is prevented from becoming complicated.

This embodiment discloses the fuel cell system including the heating unit (128) configured to heat the water trap.

Even when the outside temperature is below the freezing point, the water in the water trap can quickly defrost by heating the water trap with the heating unit. Therefore, the water can be easily purged from the water trap.

The present embodiment discloses the fuel cell system in which the cathode off-gas flows through the flow passage.

The cathode off-gas has both the water content for humidifying the oxygen-containing gas and the produced water generated by power generation by the fuel cell stack. Therefore, by providing the water trap in the pipe through which the cathode off-gas discharged from the humidifier flows, it is possible to sufficiently collect water from the cathode off-gas.

Moreover, the present invention is not limited to the above-described disclosure, and various configurations can be adopted therein without departing from the essence and gist of the present invention.

The invention claimed is:

1. A fuel cell system comprising:

a fuel cell stack;

a humidifier to which an oxygen-containing gas to be supplied to a cathode of the fuel cell stack and a cathode off-gas discharged from the fuel cell stack are introduced;

a pipe having a flow passage through which either the oxygen-containing gas having flowed through the humidifier or the cathode off-gas having flowed through the humidifier flows;

an on-off valve provided at an outlet of the flow passage and configured to open the flow passage while the fuel cell stack is in operation and close the flow passage while the fuel cell stack is not in operation; and a water trap communicating with the flow passage, wherein with high or low defined using a vertical direction as a reference, the water trap is positioned lower than the flow passage and the on-off valve is positioned higher than the water trap, and wherein the flow passage has a portion on the upstream side of the water trap, the portion having the cross-sectional area decreasing toward the water trap and having a throttle portion on a downstream end of the portion.

2. The fuel cell system according to claim 1, wherein the water trap is formed in the pipe as a recessed space continuous from the flow passage, and the water trap is positioned lower than a lowest position of the outlet of the flow passage.

3. A fuel cell system comprising:

a fuel cell stack;

a humidifier to which an oxygen-containing gas to be supplied to a cathode of the fuel cell stack and a cathode off-gas discharged from the fuel cell stack are introduced;

a pipe having a flow passage through which either the oxygen-containing gas having flowed through the humidifier or the cathode off-gas having flowed through the humidifier flows;

an on-off valve provided at an outlet of the flow passage and configured to open the flow passage while the fuel cell stack is in operation and close the flow passage while the fuel cell stack is not in operation; and a water trap communicating with the flow passage, wherein with high or low defined using a vertical direction as a reference, the water trap is positioned lower than the flow passage and the on-off valve is positioned higher than the water trap, wherein the water trap is formed so as to branch from the flow passage, and the pipe comprises:

a communication path configured to allow the flow passage and the water trap to communicate with each other; and a purge gas supply path configured to supply a purge gas to the water trap, and wherein the communication path is configured to allow water to fall into the water trap from the flow passage by gravity, and also is configured to allow the purge gas supplied from the purge gas supply path to the water trap to move toward the flow passage together with the water.

4. The fuel cell system according to claim 3, further comprising:

a heating unit configured to heat the water trap.

5. A fuel cell system comprising:

a fuel cell stack;

a humidifier to which an oxygen-containing gas to be supplied to a cathode of the fuel cell stack and a cathode off-gas discharged from the fuel cell stack are introduced;

a pipe having a flow passage through which either the oxygen-containing gas having flowed through the humidifier or the cathode off-gas having flowed through the humidifier flows;

an on-off valve provided at an outlet of the flow passage and configured to open the flow passage while the fuel cell stack is in operation and close the flow passage while the fuel cell stack is not in operation;

a water trap communicating with the flow passage;

an oxygen-containing gas supply line through which the oxygen-containing gas is supplied to the cathode; and a purge gas supply line branching off from the oxygen-containing gas supply line and connected to the purge gas supply path, wherein with high or low defined using a vertical direction as a reference, the water trap is positioned lower than the flow passage and the on-off valve is positioned higher than the water trap, wherein the water trap is formed so as to branch from the flow passage, and the pipe comprises:

a communication path configured to allow the flow passage and the water trap to communicate with each other; and a purge gas supply path configured to supply a purge gas to the water trap, and wherein a part of the oxygen-containing gas flowing through the oxygen-containing gas supply line is supplied to the water trap as the purge gas via the purge gas supply line.

6. The fuel cell system according to claim 5, further comprising:

a heating unit configured to heat the water trap.

7. The fuel cell system according to claim 1, wherein the cathode off-gas flows through the flow passage.

8. The fuel cell system according to claim 3, wherein the cathode off-gas flows through the flow passage.

9. The fuel cell system according to claim 5, wherein the cathode off-gas flows through the flow passage.

* * * * *